(12) United States Patent
Sprinkle

(10) Patent No.: US 9,478,104 B2
(45) Date of Patent: *Oct. 25, 2016

(54) SYSTEMS AND METHODS FOR DISTRIBUTED GAMING VOUCHER CONTROL

(71) Applicant: Video Gaming Technologies, Inc., Franklin, TN (US)

(72) Inventor: Jason Todd Sprinkle, Pauline, SC (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,840

(22) Filed: Jul. 31, 2013

(65) Prior Publication Data

US 2015/0038216 A1 Feb. 5, 2015

(51) Int. Cl.
A63F 9/24 (2006.01)
A63F 13/00 (2014.01)
G07F 17/32 (2006.01)

(52) U.S. Cl.
CPC ....... G07F 17/3251 (2013.01); G07F 17/3225 (2013.01); G07F 17/3241 (2013.01); G07F 17/3248 (2013.01)

(58) Field of Classification Search
CPC . G07F 17/32; G07F 17/3225; G07F 17/3251
USPC ........................................ 463/16, 20, 25, 42
See application file for complete search history.

(56) References Cited

U.S. PATENT DOCUMENTS

| 6,607,441 | B1 | 8/2003 | Acres |
| 6,916,244 | B2 | 7/2005 | Gatto et al. |
| 6,935,957 | B1 | 8/2005 | Yates et al. |
| 7,036,012 | B2 | 4/2006 | Charrin |
| 7,270,605 | B2 | 9/2007 | Russell et al. |
| 7,618,324 | B2 | 11/2009 | Gatto et al. |
| 7,717,791 | B2 * | 5/2010 | Gatto .................. G07F 17/3232 273/138.2 |
| 8,419,532 | B2 * | 4/2013 | Meyerhofer ......... G06Q 20/387 463/25 |
| 2002/0111206 | A1 | 8/2002 | Van Baltz et al. |
| 2003/0228907 | A1 | 12/2003 | Gatto et al. |
| 2005/0266919 | A1 | 12/2005 | Rowe et al. |
| 2006/0258439 | A1 | 11/2006 | White |
| 2007/0281775 | A1 * | 12/2007 | Kashima ................. G07F 17/32 463/20 |

(Continued)

FOREIGN PATENT DOCUMENTS

| GB | 2402349 A | 8/2004 |
| GB | 2403664 A | 12/2005 |

OTHER PUBLICATIONS

PCT International Search Report and Written Opinion for related matter PCT/US2014/048837 dated Nov. 24, 2014; 13 pp.

*Primary Examiner* — Jay Liddle
*Assistant Examiner* — Ryan Hsu
(74) *Attorney, Agent, or Firm* — Armstrong Teasdale LLP

(57) ABSTRACT

A system that includes a first input/output (I/O) device configured to generate a code based at least in part on a unique machine identifier of the first I/O device, and a second I/O device communicatively coupled to the first I/O device via a network. The second I/O device is configured to read the code from a tangible medium, parse the code to determine the machine identifier, transmit a validation request directly to the first I/O device via the network, and receive a response message directly from the first I/O device, wherein the response message indicates a number of credits available to a user at the second I/O device.

20 Claims, 5 Drawing Sheets

(56) References Cited

U.S. PATENT DOCUMENTS

| | | |
|---|---|---|
| 2008/0213026 A1 | 9/2008 | Grabiec et al. |
| 2009/0069076 A1 | 3/2009 | Silvestro |
| 2009/0131142 A1 | 5/2009 | Kelly |
| 2009/0149245 A1 | 6/2009 | Fabbri |
| 2009/0170594 A1* | 7/2009 | Delaney et al. ............... 463/25 |
| 2009/0181773 A1* | 7/2009 | Boesen .................. G07F 17/32 463/42 |
| 2009/0239657 A1 | 9/2009 | Ryan et al. |
| 2009/0275402 A1* | 11/2009 | Backover et al. ............. 463/29 |

\* cited by examiner

SYSTEMS AND METHODS FOR DISTRIBUTED GAMING VOUCHER CONTROL

BACKGROUND OF THE INVENTION

The embodiments described herein relate generally to gaming systems and, more particularly, to systems and methods for use in issuing and/or validating tickets via direct communication between devices.

At least some known gaming systems include a centralized database and/or server as a clearinghouse for all tickets issued within the gaming system or within localized portions of the gaming system, such as within a single casino. To issue a ticket, a gaming machine or kiosk sends commands and relevant data to the centralized database and/or server, and in response, receives an encoded value. The gaming machine or kiosk then prints the ticket, including the encoded value verbatim. To validate the ticket, a gaming machine or kiosk reads data from the ticket, routes the ticket data to the centralized database and/or server for validation, and receives an approval or rejection of the ticket from the centralized database and/or server. The gaming machine or kiosk then takes corresponding actions, such as enabling game play or displaying an error message.

Although such systems are well-known, the costs associated with purchasing, installing, set up, and maintenance of at least some known centralized gaming systems may be prohibitively large for smaller operations, such as bars, pubs, and small casinos. Moreover, new capabilities may need to be introduced at each gaming machine or kiosk and at the centralized database and/or server. The centralized database and/or server may also require additional programming and/or re-configuration to effectively use the new features when issuing and validating tickets. Depending on a relative location and number of the gaming machines and kiosks, such updates, additional programming, and/or configuration changes may be costly and/or time-consuming.

BRIEF DESCRIPTION OF THE INVENTION

In one aspect, a system includes a first input/output (I/O) device configured to generate a code based at least in part on a unique machine identifier of the first I/O device, and a second I/O device communicatively coupled to the first I/O device via a network. The second I/O device is configured to read the code from a tangible medium, parse the code to determine the machine identifier, transmit a validation request directly to the first I/O device via the network, and receive a response message directly from the first I/O device, wherein the response message indicates a number of credits available to a user at the second I/O device.

In another aspect, an input/output (I/O) device is provided for use with a gaming network. The I/O device includes a memory area, a network interface, and a processor coupled to the memory area and network interface. The processor is configured to read a code from a tangible medium, parse the code to determine a unique machine identifier, transmit a validation request via said network interface directly to a second input/output(I/O) device associated with the machine identifier, and receive a response message directly from the second input/output device, wherein the response message indicates approval to apply a number of credits available to a user to a credit display associated with the I/O device.

In yet another aspect, a method is provided for verifying a gaming voucher using a first input/output (I/O) device and a second I/O device. The method includes generating a code based at least in part on a unique identifier of the first I/O device of a gaming machine, and storing the code in a memory area of the first I/O device. The method also includes receiving a verification request from the second I/O device via a network, determining, by the code in the memory area, a number of credits available to a player at the second I/O device, and transmitting a response message from the first I/O device to the second I/O device via the network, wherein the response includes the number of available credits available to the player at the second I/O device.

DETAILED DESCRIPTION OF THE INVENTION

Exemplary embodiments of systems, methods, and apparatus for use in verifying a player account using a code output on a tangible medium are described herein. Moreover, the embodiments described herein enable gaming machine input/output (I/O) devices, or any other suitable device, to directly communicate with each other without a centralized communication system or server. An I/O device, such as a printer, reader, or combination printer and reader device, enables gaming machines, or any other suitable device, to print and/or read a ticket or voucher and to verify the contents of the ticket or voucher by communicating directly with the gaming machine, or other suitable device, without affecting an existing game's software. Moreover, the embodiments described herein enable peer-to-peer authentication of tickets or vouchers without a centralized database. In some embodiments, the embodiments described herein provide a method of issuing and receiving a game ticket or voucher using, for example, a peripheral device such as a printer without involving a centralized voucher validation system or even the gaming machine. For example, in some embodiments, the peripheral device issues a ticket that includes a code, and such devices can also receive a ticket that includes a code. The peripheral device uses a peer-to-peer connection to communicate with another peripheral device directly or to a gaming machine, kiosk, or point-of-sale (POS) device having such a peripheral that was used to generate the ticket. The second, originating peripheral stores the code in its own memory area or in the gaming machine's memory area, for example, and includes build-in logic to compare the received data to the stored data to verify the ticket.

Figure 1:
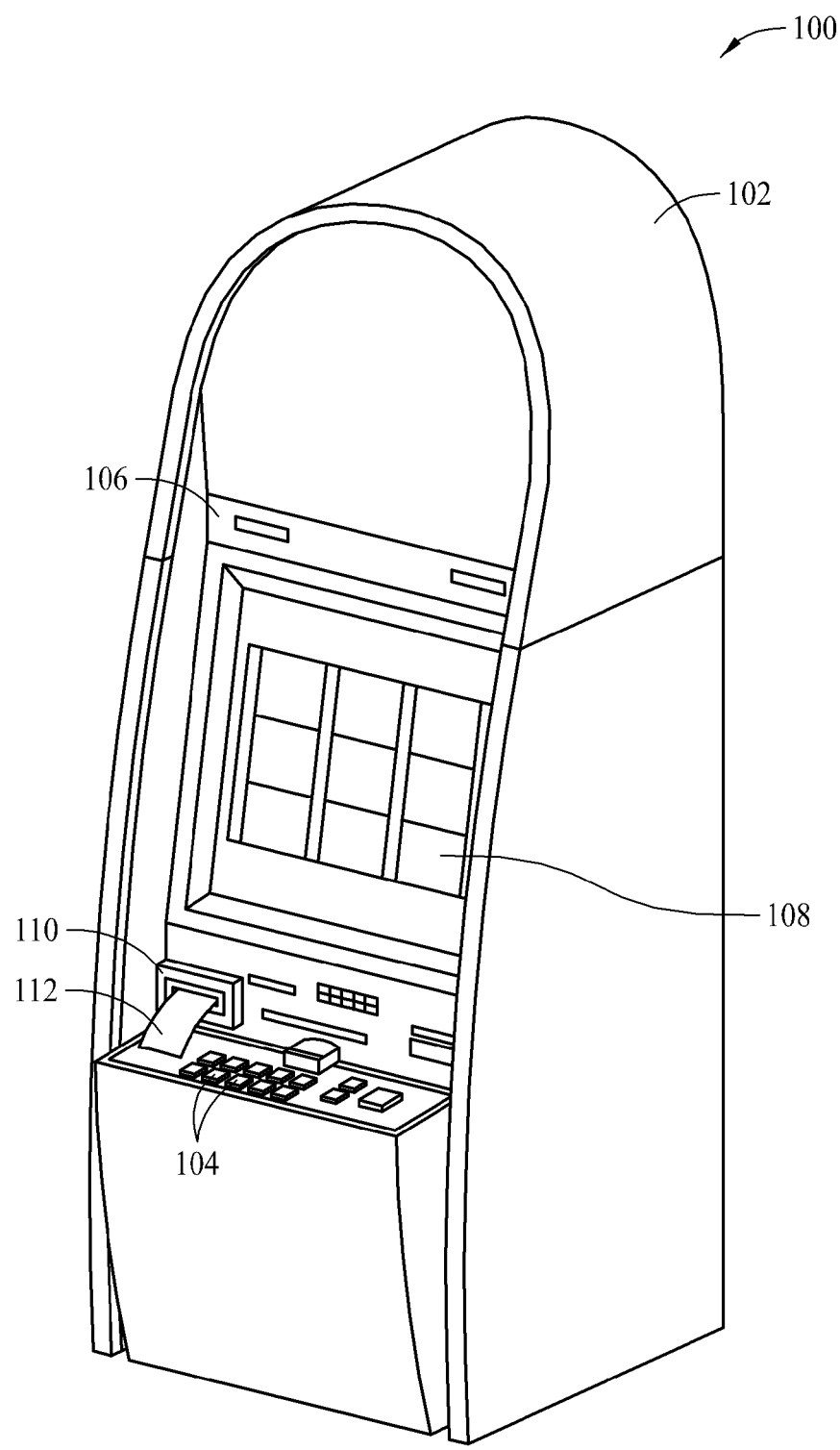
FIG. 1 is a perspective view of an exemplary gaming machine.

FIG. 1 is a perspective view of an exemplary gaming machine 100. In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator, a pseudo-random number generator, or any other suitable randomization process.

In the exemplary embodiment, gaming machine 100 includes a cabinet 102 configured to house a plurality of components, such as a gaming machine controller, peripheral devices, display devices, and player interaction devices. For example, in the exemplary embodiment, gaming machine 100 includes a plurality of switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

Gaming machine 100 also includes one or more display devices 108. Display devices 108 are mounted to cabinet 102, and may include a primary display device for displaying a primary game and a secondary display device for displaying a secondary and bonus game. Display devices 108 may include, without limitation, a plasma display, a liquid crystal display (LCD), and/or a display based on light emitting diodes (LEDs), organic light emitting diodes (OLEDs), polymer light emitting diodes (PLEDs), and/or surface-conduction electron emitters (SEDs). In the exemplary embodiment, display device 108 is used to display one or more game image, symbols and indicia such as a visual representation or exhibition of movement of an object such as a mechanical, virtual, or video reel, dynamic lighting, video images, and the like. In an alternative embodiment, display device 108 displays images and indicia using mechanical means. For example, display device 108 may include an electromechanical device, such as one or more rotatable reels, to display a plurality of game or other suitable images, symbols, or indicia.

Moreover, gaming machine 100 includes an input/output (I/O) device 110 coupled to front 106 for accepting and/or validating cash bills and/or tickets or vouchers 112, as described in greater detail below. I/O device 110 may also be capable of printing and/or reading tickets 112 as is described in greater detail below. Furthermore, in some embodiments, I/O device 110 includes a card reader or validator for use with credit cards, debit cards, identification cards, and/or smart cards. The cards accepted by I/O device 110 may include a magnetic strip and/or a preprogrammed microchip that includes a player's identification, credit totals, and any other relevant information that may be used. For example, as described below, credits may be transferred from one gaming machine 100 directly to another gaming machine 100 without an intervening server. Alternatively, credits may be transferred from gaming machine 100 to and/or from another device capable of reading and/or outputting a coded tangible medium, such as a barcode on ticket 112 or a radio frequency identification (RFID) chip. Such devices may include, but are not limited to only including, kiosks, bar top games, point-of-sale (POS) devices, and the like. The credit transfer is based on a verification routine in which a receiving device reads a code from a tangible medium and determines an originating device that output the tangible medium. The receiving device directly contacts the originating device, and the originating device determines a number of credits available to the user or player. The originating device then provides verification to the receiving device and the credits are applied to, for example, a credit display for use by the user or player.

Figure 2:
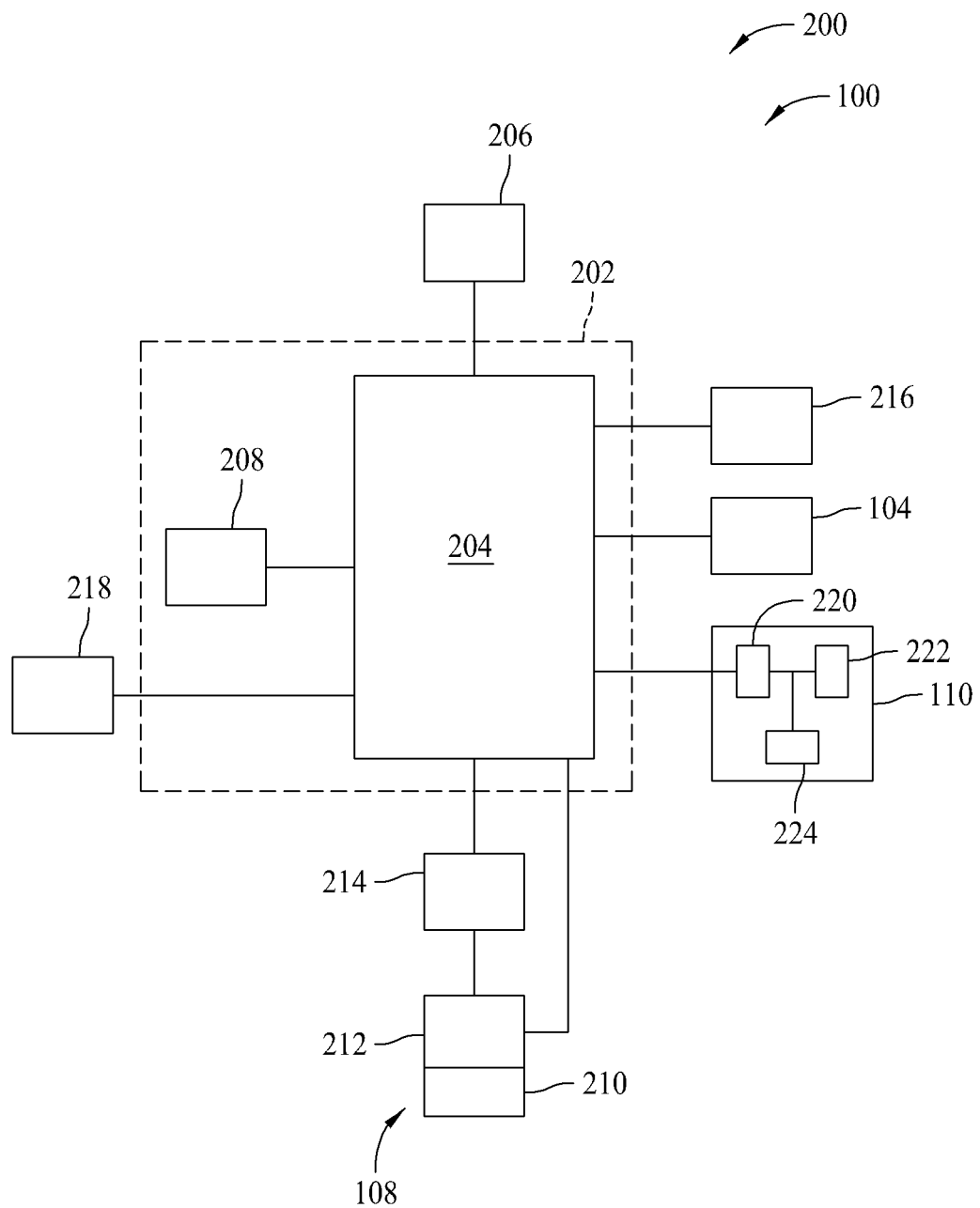
FIG. 2 is a block diagram of an exemplary electrical architecture that may be used with the gaming machine shown in FIG. 1.

FIG. 2 is a block diagram of an exemplary electrical architecture 200 that may be used with gaming machine 100 (shown in FIG. 1). In the exemplary embodiment, gaming machine 100 includes a gaming machine controller 202, or controller board, having at least one processor 204, such as a microprocessor, a microcontroller-based platform, a suitable integrated circuit or one or more application-specific integrated circuits. Processor 204 communicates with one or more other gaming machines 100 or other suitable devices via a network interface 206. Moreover, processor 204 is communicatively coupled to at least one data storage or memory area 208. In the exemplary embodiment, processor 204 and memory area 208 are located within cabinet 102 (shown in FIG. 1). Memory area 208 stores program code and instructions that are executable by processor 204 to control gaming machine 100. Memory area 208 also stores other data such as image data, event data, player tracking data, accounting data, paytable data, and/or other information or applicable game rules that relate to game play at gaming machine 100. Memory area 208 may include one or more forms of memory. For example, memory area 208 can include random access memory (RAM), read-only memory (ROM), flash memory, and/or electrically-erasable programmable read-only memory (EEPROM). However, any other suitable magnetic, optical, and/or semiconductor memory architecture, by itself or in combination, may be included in memory area 208.

Moreover, in the exemplary embodiment, display devices 108 are controlled by controller 202. In some embodiments, display device 108 includes a touch screen 210 and an associated touch screen controller 212. A video controller 214 is communicatively coupled to controller 202 and touch screen controller 212 to enable a player to input game play decisions into gaming machine 100 via touch screen 210. Gaming machine 100 also includes a credit display 216 for displaying a player's current number of credits, cash, or account balance. Credit display 216 may be separated into, for example, a number of currently available credits for wagering or for use in purchasing goods or services, and a number of credits selected to wager on a game. In some embodiments, credit display 216 is incorporated into display device 108.

Furthermore, gaming machine 100 includes one or more communication ports 218 that enable controller 202 to communicate with external peripheral devices (not shown) such as, but not limited to, external video sources, expansion buses, game or other displays, a SCSI port, a serial port, a USB port, or a key pad. In some embodiments, communication port 218 enables communication between I/O device 110 and controller 202.

In the exemplary embodiment, I/O device 110 includes a communication interface 220, a processor 222, and a memory area 224. Memory area 224 stores program code and instructions that are executable by processor 222 to control I/O device 110. Memory area 224 also stores other data such as unique identifiers for I/O device 110 and other I/O devices on the network and/or unique voucher identifiers associated with vouchers or tangible media output by I/O device. Memory area 224 may include one or more forms of memory. For example, memory area 224 can include random access memory (RAM), read-only memory (ROM), flash memory, and/or electrically-erasable programmable read-only memory (EEPROM). However, any other suitable magnetic, optical, and/or semiconductor memory architecture, by itself or in combination, may be included in memory area 208.

In some embodiments, controller 202 includes one or more of the above-described elements. For example, in one embodiment, controller 202 includes processor 204, memory area 208, video controller 214, and network interface 206.

Figure 3:
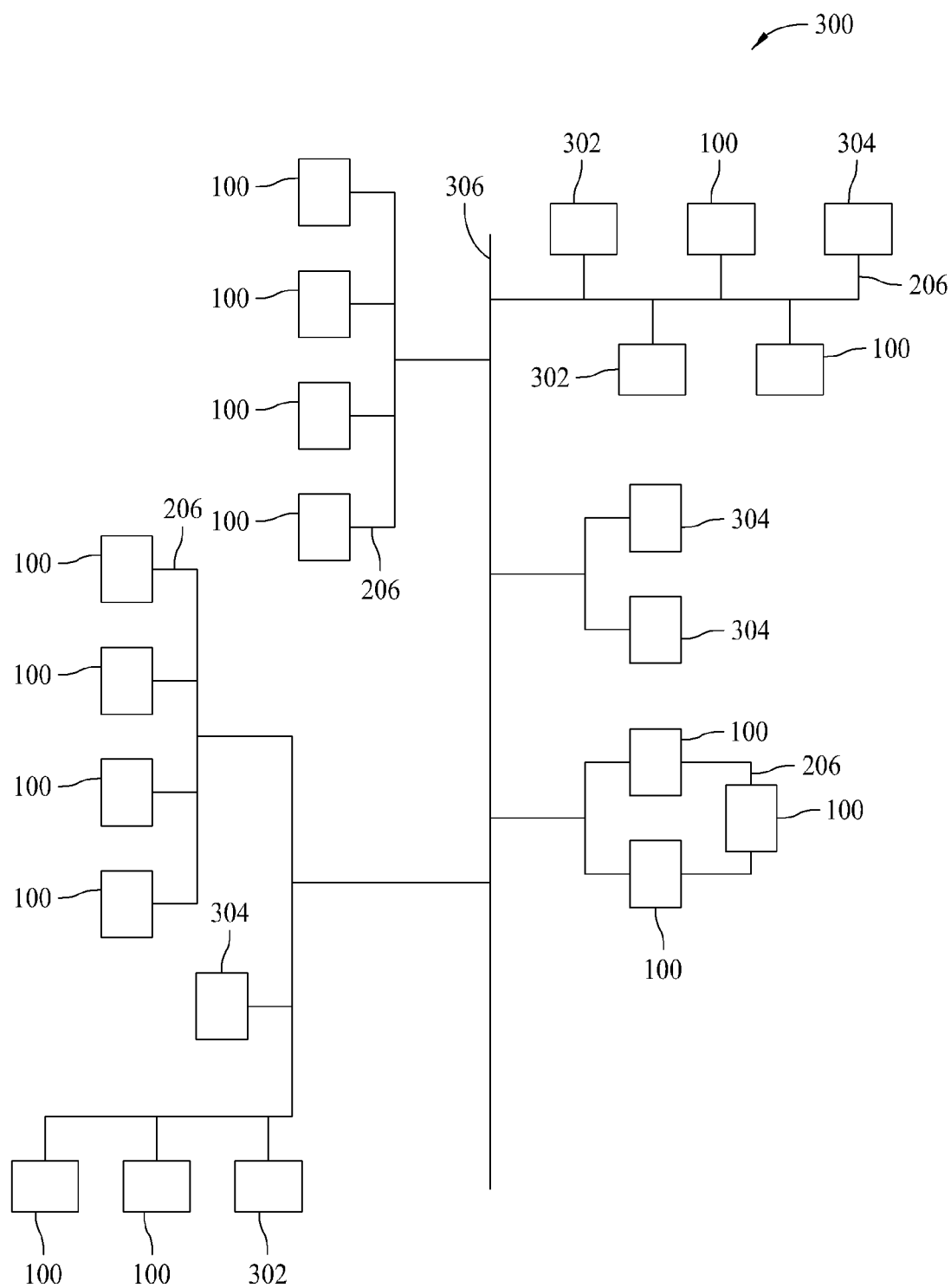
FIG. 3 is a block diagram of an exemplary gaming system.

FIG. 3 is a block diagram of an exemplary gaming system 300. In the exemplary embodiment, gaming system 300 includes a plurality of gaming machines 100. Moreover, in some embodiments, gaming system 300 includes a plurality of kiosk devices 302 and/or a plurality of POS devices 304. Each gaming machine 100, kiosk device 302, and POS device 304 is coupled via a network interface 206 to a network 306 to facilitate direct data communication between gaming machines 100, kiosk devices 302, and POS devices 304. Moreover, each kiosk device 302 and/or POS device 304 includes an electrical architecture substantially similar to electrical architecture 200 (shown in FIG. 2). For example, each kiosk device 302 and/or POS device 304 includes at least a respective I/O device 110 (shown in FIG. 2).

Gaming machines 100 may include video poker machines, video slot machines, electromechanical slot machines, video bingo machines, and/or other similar gaming machines. Kiosk devices 302 may include any self-service device that enables users to use cash or credits to perform a desired transaction. For example, kiosk devices 302 may enable users to perform transactions such as cash withdrawals, bill payment, check cashing, or credit applications, check-in and check-out transactions at hotels and/or airlines, and/or any other suitable transactions. POS devices 304 may also include any point-of-sale device that enables users to perform consumer transactions such as purchases of goods, food and drink, and/or services. Kiosk devices 302 and/or POS devices 304 may be located inside the same site as gaming machines 100, such as a casino, or may be located at one or more sites external to a casino.

In the exemplary embodiment, gaming machines 100, I/O devices 110, kiosk devices 302, and POS devices 304 are configured to directly communicate via network 306 without intervention of, for example, a server or other central device. For example, in one embodiment, a first I/O device at a first location generates a code based at least in part on a unique machine identifier and outputs the code on a tangible medium that is distributed to a user. The user can then scan the code at a second I/O device and/or insert the tangible medium into the second I/O device for the second I/O device to read the code from the tangible medium. The second I/O device at a second location parses the code to determine the machine identifier of the first I/O device, and transmits a validation request directly to the first I/O device network 306. The first I/O device parses the verification request to determine a unique identifier associated with the tangible medium and determines from a number of credits available to the user based on the voucher identifier. The first I/O device then transmits a response message directly to the second I/O device and the second I/O device applies the number of available credits to credit display 216 (shown in FIG. 2). The first I/O device may be gaming machine 100, kiosk 302, POS device 304, or I/O device 110 (shown in FIG. 1) within some other suitable device. Similarly, the second I/O device may be gaming machine 100, kiosk 302, POS device 304, or I/O device 110 within some other suitable device.

Figure 4:
FIG. 4 is a front view of an exemplary ticket that may be used with the gaming machine shown in FIG. 1 and/or the gaming system shown in FIG. 3.

FIG. 4 is a front view of an exemplary ticket 112. In the exemplary embodiment, ticket 112 includes a code 114 that encodes identification data and value data. The value data represents a value of ticket 112. The identification data may include, for example, player identification data, such as a unique player identifier or player tracking number and/or device identification, such as a unique machine identifier associated with the device that output ticket 112. In addition, the identification data may include date and time data, such as valid dates and/or times for use of ticket 112 and/or a date and/or time at which ticket 112 was output. Moreover, the identification data may include casino or venue identification data. It should be understood that any other suitable identification data may also be included in code 114. In the exemplary embodiment, code 114 is embodied as a barcode that is printed onto ticket 112. However, code 114 may also be implemented in other forms such as a magnetic strip, magnetic ink character recognition (MICR), an RFID tag or chip, character printing, an image, or any other suitable means of conveying unique data characteristics. In some embodiments, code 114 is encrypted prior to being applied to ticket 112. In the exemplary embodiment, ticket 112 is a paper-based product. However, ticket 112 may also be implemented in other forms such as a plastic card, for example.

In the exemplary embodiment, I/O device 110 (shown in FIG. 1) is used to produce ticket 112 and to read ticket 112. For example, I/O device 110 includes a printer (not shown) that prints code 114 onto ticket 112 using, for example, laser printing, thermal printing, or any other suitable process. I/O device 110 also includes a reader (not shown) that reads code 114 from ticket 112. In one embodiment, I/O device 110 includes a processor (not shown) that communicates data with processor 204 and/or memory area 208 (both shown in FIG. 2) for use in generating code 114. In the exemplary embodiment, I/O device 110 includes processor 222 and memory area 224 (both shown in FIG. 2) that both communicate data with processor 204 and/or memory area 208 for use in generating code 114. Moreover, in the exemplary embodiment, I/O device 110 includes processor 222, memory area 224, and network interface 220 for use in generating code 114 and for directly communicating data with other I/O devices 110, gaming machines 100 (shown in FIGS. 1-3), kiosks 302 (shown in FIG. 3), and/or POS devices 304 (shown in FIG. 3) via network 306 (shown in FIG. 3).

Figure 5:
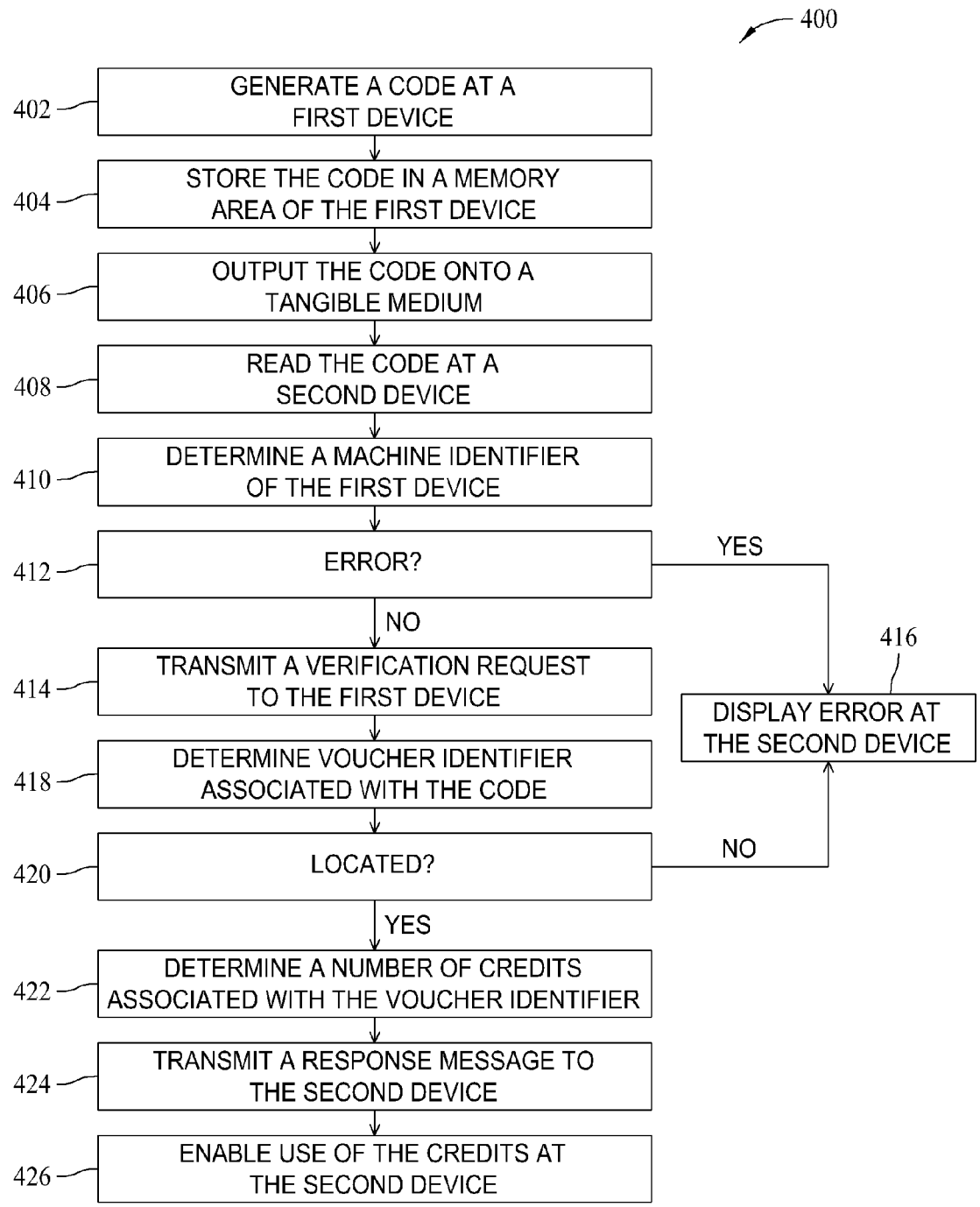
FIG. 5 is a flowchart that illustrates an exemplary method for use with the gaming system shown in FIG. 3.

FIG. 5 is a flowchart 400 illustrating an exemplary method for verifying a player account and/or for determining a number of available credits available to a player via direct communication between any two gaming machines 100, I/O devices 110, kiosks 302, and/or POS devices 304 via network 306 (each shown in FIG. 3). In the exemplary embodiment, a first device, such as gaming machine 100, kiosk 302, POS device 304, or standalone I/O device 110, generates 402 code 114 (shown in FIG. 4). In the exemplary embodiment, code 114 is generated based at least in part on a unique machine identifier of the first device and a unique voucher identifier. For example, the first device may be assigned a unique serial number, IP address, MAC address, or any other suitable identifier. Similarly, a unique voucher identifier may be assigned to track a voucher and stored in memory area 224 (shown in FIG. 2). In some embodiments, code 114 is also based on, for example, value data, player identification data, such as a unique player identifier or player tracking number, date and time data, and/or casino or venue identification data. In the exemplary embodiment, the first device stores 404 code 114 in, for example, memory area 224. Within memory area 224, code 114 may be associated with the machine identifier and/or a voucher identifier. For example, processor 222 (shown in FIG. 2) may search memory area 224 for the voucher identifier and associate code 114 and/or a number of credits available to the player with the voucher identifier. The first device then outputs 406 code 114 onto a tangible medium, such as ticket 112 (shown in FIG. 4).

When a player or user wishes to access the credits associated with code 114, a second device, such as a gaming machine 100, kiosk 302, POS device 304, or standalone I/O device 110, receives ticket 112 and reads 408 code 114. In the exemplary embodiment, the second device parses code 114 to determine 410 the machine identifier of the first device for use in generating a verification request. For example, the second device may decrypt code 114 if previously encrypted, and parse or analyze code 114 to determine 410 the machine identifier. Moreover, the second device may parse or analyze code 114 to determine a voucher identifier that is associated in memory area 224 with a number of credits available to the player or user and/or to determine a player identifier. In the exemplary embodiment, if no errors are encountered 412, the second device creates and transmits 414 a verification request directly to the first device via network 306 (shown in FIG. 3). The verification request includes, for example, the machine identifier of the first device, the player identifier, and/or the number of credits available to the player or user. In some embodiments, the second device encrypts the verification request prior to transmission. If an error is encountered 412, the second device displays 416 an error message via display device 108 and/or I/O device 110 (both shown in FIG. 2).

In the exemplary embodiment, and in response to the verification request, the first device parses the verification request to determine 418 the voucher identifier. The first device then locates 420 the voucher record in memory area 208 that is associated with the voucher identifier. If the voucher record is located 420, the first device determines 422 a number of credits available to the player. For example, the first device processor 204 may search memory area 208 for the voucher identifier to determine the number of credits available to the player. If the voucher record is not located 420, the second device displays 416 an error message via display device 108 and/or I/O device 110. Moreover, in some embodiments, the first device can verify that code 114 is validated within a time range specified within code 114 or stored in memory area 208. Furthermore, in some embodiments, the first device can verify that the second device is eligible for use by the player to use the credits. For example, a minor that is ineligible to gamble will be unable to use his credits at gaming machine 100, but will be able to use his credits at POS device 304.

In the exemplary embodiment, the first device transmits 424 a response message to the second device via network 306. The response message may include, for example, the number of credits available for use by the player at the second device, an indication that the credits may be used within a specified time period, and/or an indication that the player is eligible to use the credits at the second device. In such a case, the second device enables 426 use of the credits by applying at least a portion of the credits to credit display 216. Alternatively, the response message may include a negative response that indicates that the player is ineligible to use the credits at the second device, which the credits cannot currently be used, and/or that code 114 did not match any records stored in memory area 208. In such a case, the second device displays 416 an error message to the player via display device 108 and/or I/O device 110.

Exemplary embodiments of systems, methods, and apparatus for use in verifying a player account using a code output on a tangible medium are described above in detail. The systems, methods, and apparatus not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A controller or controller board, such as those described herein, includes at least one processor or processing unit and a system memory. The controller or controller board typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a first gaming machine comprising a first input/output (I/O) device configured to generate a code based on a unique machine identifier of said first I/O device and a unique identifier associated with a voucher generated by said first I/O device;
    a second gaming machine comprising a second I/O device communicatively coupled to said first I/O device via a network, said second I/O device comprising a voucher reader, said second I/O device configured to:
        read the code from the voucher by said voucher reader;
        parse the code to determine the machine identifier of said first I/O device;
        transmit a validation request directly to only said first I/O device via said network using the machine identifier of said first I/O device and the unique identifier associated with the voucher;
        receive a response message directly from said first I/O device, wherein the response message verifies the authenticity of the voucher presented at said second I/O device.

2. A system in accordance with claim 1, wherein said first I/O device comprises a memory and a processor coupled to said memory, said processor configured to:
    store the code in said memory area;
    receive the verification request directly from said second I/O device; and
    transmit the response message directly to said second I/O device.

3. A system in accordance with claim 2, wherein said memory area is configured to store a plurality of unique voucher identifiers, said processor is further configured to:
    parse the verification request to determine a voucher identifier of a voucher being verified;
    compare the voucher identifier to the plurality of voucher identifiers stored in said memory area; and
    determine from said memory area the number of credits available to the user if the voucher identifier matches one of the plurality of voucher identifiers.

4. A system in accordance with claim 1, wherein said first I/O device is further configured to output the code on a voucher.

5. A system in accordance with claim 3, wherein said second I/O device is further configured to apply the number of credits to a credit display for use by the user.

6. A system in accordance with claim 1, wherein said second I/O device is configured to read the code from a voucher.

7. A first input/output (I/O) device for use with a gaming network, said first I/O device comprising:
    a memory area;
    at least one of a voucher printer, a voucher reader, and a combination voucher reader/printer and voucher reader communicatively coupled to a network interface; and
    a processor coupled to said memory area and said network interface, said processor configured to:
        read a code from a voucher using at least one of said voucher reader and said combination voucher reader/printer;
        parse the code to determine a unique machine identifier of a second I/O device which originated the code on the voucher;
        transmit a validation request by said at least one of said voucher reader and said combination voucher reader/printer via said network interface directly to only the second I/O device; and
        receive a response message directly from the second I/O device, wherein the response message indicates approval to apply a number of credits available to a user to a credit display associated with the first I/O device.

8. The first I/O device of claim 7, further comprising a scanning device configured to read the code from a voucher and to transmit the code to said processor.

9. The first I/O device of claim 8, wherein said scanning device comprises one of a barcode scanner, a radio frequency identification (RFID) reader, and an optical reader.

10. The I/O device of claim 7, wherein said processor is further configured to:
    generate the code based at least in part on a unique machine identifier associated said I/O device;
    store the code in said memory area;
    receive the verification request via said network interface; and
    transmit the response message via said network interface.

11. The I/O device of claim 7, wherein said memory area is further configured to store a plurality of unique voucher identifiers, said processor is further configured to:
- parse the verification request to determine an identifier of the voucher;
- compare the identifier to the plurality of voucher identifiers; and
- determine from said memory area the number of credits available to the user based on the identifier if the identifier matches one of the plurality of voucher identifiers.

12. The I/O device of claim 7, wherein said I/O device is further configured to output the code on the voucher.

13. The I/O device of claim 12, wherein said I/O device comprises a printer.

14. A method for verifying a gaming voucher using a first voucher input/output (I/O) device consisting of at least one of a voucher printer, a voucher reader, and a combination voucher printer and voucher reader and a second voucher I/O device consisting of at least one of a voucher printer, a voucher reader, and a combination voucher printer and voucher reader, said method comprising:
- generating, by the first voucher I/O device, a code based at least in part on a unique identifier of the first voucher I/O device of a gaming machine and a unique identifier of the voucher;
- storing the code in a memory area of the first voucher I/O device;
- receiving, by only the first voucher I/O device, a verification request directly from the second voucher I/O device via a network;
- determining, by the code in the memory area, a number of credits available to a player at the second voucher I/O device; and
- transmitting a response message from the first voucher I/O device directly to the second voucher I/O device via the network, wherein the response verifies the authenticity of the voucher presented at the second voucher I/O device.

15. The method of claim 14, wherein generating a code comprises generating the code based on the machine identifier, the issuance time and date of the voucher, and a unique voucher identifier.

16. The method of claim 14, wherein storing the code comprises storing the code in the memory area in association with the voucher identifier.

17. The method of claim 14, wherein determining a number of credits comprises:
- parsing the verification request to determine a unique voucher identifier;
- searching the memory area for the voucher identifier; and
- determining the number of credits associated with the voucher identifier.

18. The method of claim 14, further comprising outputting the code on a voucher.

19. The method of claim 18, wherein the verification request is based on the second voucher I/O device reading the code from the voucher.

20. The method of claim 14, wherein the code is generated at a conclusion of a play session by the player at the gaming machine.

\* \* \* \* \*